May 23, 1967 H. M. BANK 3,321,124
CONTAINER LID
Filed Dec. 29, 1964

INVENTOR
HERBERT M. BANK

BY Albert J. Kramer
ATTORNEY 3,321,124
CONTAINER LID
Herbert M. Bank, Baltimore, Md., assignor to Maryland Cup Corporation, Owings Mills, Md., a corporation of Maryland
Filed Dec. 29, 1964, Ser. No. 421,851
7 Claims. (Cl. 229—43)

This invention relates to lids and it is more particularly concerned with lids which are adapted to conventional containers commercially used to hold products such as ice cream, cottage cheese, sour cream, and solids and liquids of various kinds generally.

An object of the invention is the provision of a container lid which can be manufactured in one piece and which comprises improvements over previous types of lids.

A specific object of the invention is the provision of such a lid which contains a pocket in communication with the container when placed thereon and which pocket functions as an extension of the container to receive excess filling materials.

Another object of the invention is the provision of a lid of the type mentioned which forms a protective seal of the interior of the container and of the pocket in the lid when the lid is placed on the container.

These and still further objects, advantages, and features of the invention will appear more fully from the following description in conjunction with the accompanying drawing.

Figure 1:
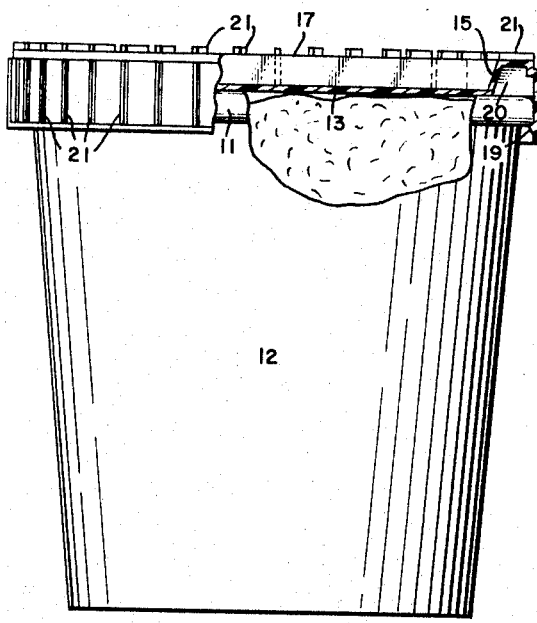
FIG. 1 is an elevational view of a typical container and lid thereon in accordance with an embodiment of the invention, partly broken away.

Referring with more particularity to the drawing in which like numerals designate like parts, the embodiment illustrated comprises a lid adapted to fit the beaded rim 11 of a container 12.

The lid comprises a panel 13 which generally conforms to the shape of the beaded rim 11, such as the circular shape illustrated.

However, shapes not shown such as square, rectangular, oval, and so forth, may be used as well.

The panel 13 is provided with a radial extension 14 in the general cross-sectional shape of an inverted U providing an inner wall 15 encircling the panel adjacent to its periphery and an outer wall 16 spaced from and encircling the inner wall 15. A top wall 17 interconnects the walls 15 and 16 to complete the inverted U shape.

The panel 13 is somewhat smaller than the opening of the container so that pockets 18, formed by sections of the walls 15, 16 and 17 between consecutive ribs 20, hereinafter described, communicate with the interior of the container.

Figure 4:
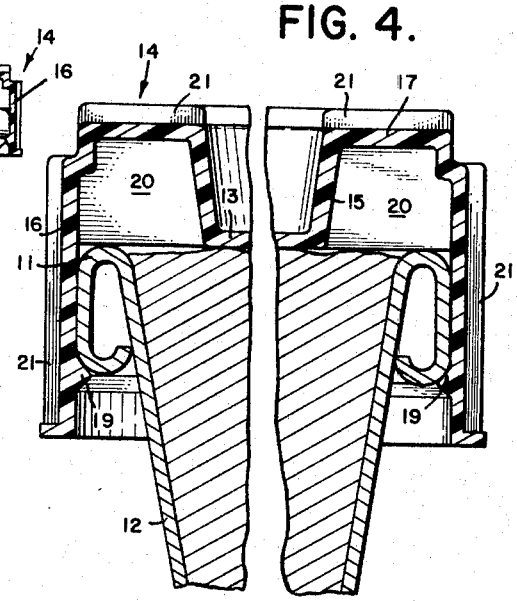
FIG. 4 is a section along the line 4—4 of FIG. 2, partly broken away.
Figure 2:
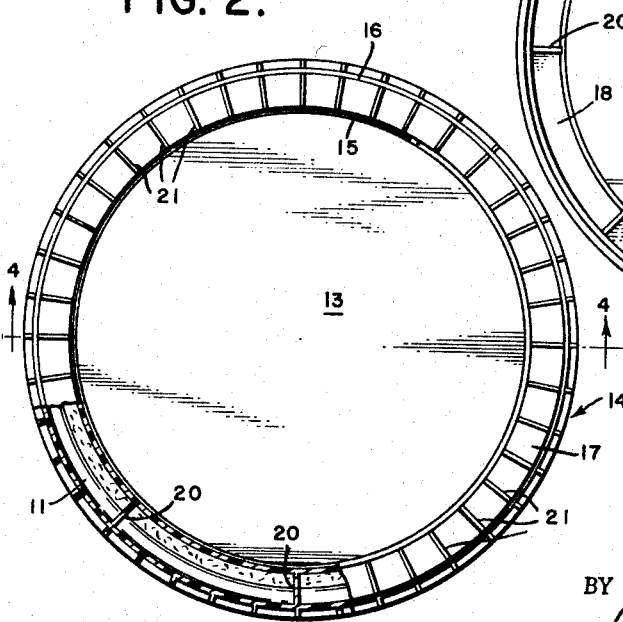
FIG. 2 is a top plan view of the lid and container, partly broken away.
Figure 3:
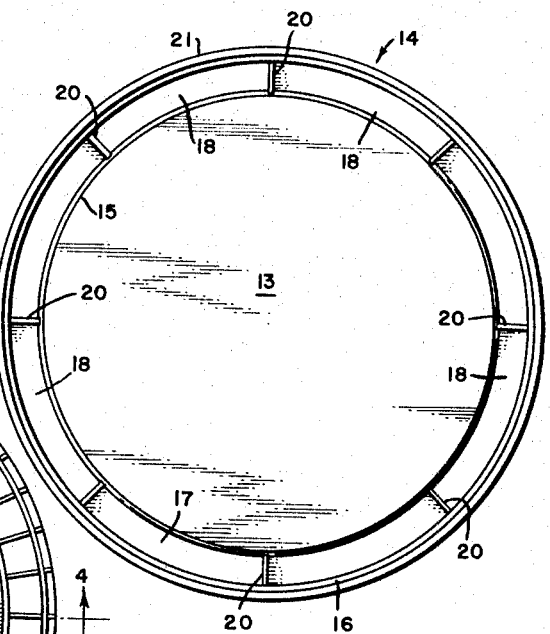
FIG. 3 is a bottom plan view of the lid, apart from the container.

The outer wall 16 extends downwardly below the plane of the panel 13 about the beaded rim 11 and it is provided with an annular ridge 19 on its inner side which contacts the beaded rim at the bottom thereof and forms a seal therewith (see FIG. 4). The ridge 19 also acts to releasably hold the lid in place against forces such as trapped air under pressure in the container.

Radial ribs 20 are integral with the walls 15, 16 and 17 and spaced circumferentially to form the pockets 18 therewith.

These ribs serve to strengthen the walls, to resist crushing, and also function as a seat for the lid on the rim 11 of the container.

The lid may be made of any suitable material but it is preferably made of a plastic material in one piece, such as by molded polystyrene or any other conventional structural plastic material.

A series of fins 21 may be provided on exterior surfaces of the lid to facilitate gripping it when placing it on and removing it from containers.

Having thus described my invention, I claim:

1. A lid comprising a panel adapted to conform generally to the shape of a container opening to be closed, said panel having a radial extension in the general cross-sectional shape of an inverted U, providing an inner wall encircling the panel adjacent to its periphery and an outer wall spaced from and encircling the inner wall, a top interconnecting wall, and ribs below the top interconnecting wall bridging the space between the inner and outer walls, the bottom of the inner wall being joined to the periphery of the panel, said inner wall extending upwardly and outwardly to the top interconnecting wall.

2. A lid as defined by claim 1 in which the ribs are circumferentially spaced.

3. A lid as defined by claim 2 in which the ribs are integral with the inner, outer and top walls.

4. A lid as defined by claim 1 in which the panel is generally circular, the panel being of a diameter less than the diameter of the container opening, to which it is adapted to conform, the diameter of the outer wall being larger than the diameter of the said container opening.

5. A lid for a container having a conical side wall, a bottom wall, and an open top, said open top having a beaded rim, said lid comprising a panel conforming to the shape of the opening, the periphery of the panel being inwardly offset from the beaded rim when disposed in the open top, said panel having a radial extension in the general cross-sectional shape of an inverted U providing an inner wall encircling the panel adjacent its periphery on the inner side of the beaded rim and an outer wall spaced from and encircling the inner wall on the outer side of the beaded rim, a top wall interconnecting said inner and outer walls, ribs below the top wall bridging the space between the inner and outer wall, said ribs being adapted to contact the top of the beaded rim when the cover is disposed on the container, the bottom of the inner wall being joined to the periphery of the panel, said inner wall extending upwardly and outwardly to the top interconnecting wall.

6. A cover for a container as defined by claim 5 in which the lid is of one piece of material and the ribs are circumferentially spaced and exceed two in number.

7. A cover as defined by claim 5 in which the outer wall comprises an annular ridge on its inner surface between the bottom thereof and the ribs, said ridge extending inwardly from the inner surface in an amount sufficient to contact the bottom of the beaded rim when the lid is placed on the container.

References Cited by the Examiner
UNITED STATES PATENTS

| | | | |
|---|---|---|---|
| 2,614,727 | 10/1952 | Robinson | 150—.5 X |
| 2,752,972 | 7/1956 | Tupper | 150—.5 |
| 2,873,782 | 2/1959 | Gunn | 150—.5 |

FOREIGN PATENTS

| | | |
|---|---|---|
| 1,345,768 | 11/1963 | France. |
| 932,356 | 7/1963 | Great Britain. |
| 598,487 | 10/1959 | Italy. |

JOSEPH R. LECLAIR, Primary Examiner.

D. F. NORTON, Assistant Examiner.